(12) United States Patent
Donaldson

(10) Patent No.: US 9,550,328 B2
(45) Date of Patent: Jan. 24, 2017

(54) SYSTEM AND METHOD FOR REDUCING OR ELIMINATING HUE SHIFT IN THREE-DIMENSIONAL PRINTED OBJECTS

(71) Applicant: Xerox Corporation, Norwalk, CT (US)

(72) Inventor: Patricia J. Donaldson, Pittsford, NY (US)

(73) Assignee: Xerox Corporation, Norwalk, CT (US)

(*) Notice: Subject to any disclaimer, the term of this patent is extended or adjusted under 35 U.S.C. 154(b) by 21 days.

(21) Appl. No.: 14/578,963

(22) Filed: Dec. 22, 2014

(65) Prior Publication Data

US 2016/0176113 A1  Jun. 23, 2016

(51) Int. Cl.

| | | |
|---|---|---|
| B28B 17/00 | (2006.01) | |
| B28B 1/16 | (2006.01) | |
| B29C 35/08 | (2006.01) | |
| B29C 67/00 | (2006.01) | |
| B29L 9/00 | (2006.01) | |
| B33Y 10/00 | (2015.01) | |
| B33Y 30/00 | (2015.01) | |
| B33Y 50/02 | (2015.01) | |
| B33Y 80/00 | (2015.01) | |

(52) U.S. Cl.
CPC ....... *B29C 67/0088* (2013.01); *B29C 67/0059* (2013.01); *B29L 2009/00* (2013.01); *B33Y 10/00* (2014.12); *B33Y 30/00* (2014.12); *B33Y 50/02* (2014.12); *B33Y 80/00* (2014.12)

(58) Field of Classification Search
CPC .................... B29C 67/0059; B29C 67/0089
USPC ........................................... 425/375
See application file for complete search history.

(56) References Cited

U.S. PATENT DOCUMENTS 8,323,017 B2 * 12/2012 Kritchman .......... B29C 67/0059
425/375
2003/0214719 A1   11/2003 Bourdelais et al.

* cited by examiner

*Primary Examiner* — Joseph S. Del Sole
*Assistant Examiner* — Thukhanh T Nguyen
(74) *Attorney, Agent, or Firm* — Maginot Moore & Beck LLP

(57) ABSTRACT

A method of forming an image on a three-dimensional printed object includes operating first plurality of ejectors to form a first layer of a blocking material having an opacity level that prevents transmission of incident visible light to another layer in the three-dimensional printed object, operating a second plurality of ejectors to form a second layer of a primer material over the first layer, and operating a third plurality of ejectors to form a printed image from at least one marking agent over the primer material. The layers of blocking material and primer material reduce or eliminate hue shift in the image.

7 Claims, 4 Drawing Sheets

SYSTEM AND METHOD FOR REDUCING OR ELIMINATING HUE SHIFT IN THREE-DIMENSIONAL PRINTED OBJECTS

TECHNICAL FIELD

This disclosure is directed to three-dimensional object printing systems and, more particularly, to systems and methods of applying colors and images to objects that are formed in a three-dimensional object printer.

BACKGROUND

Three-dimensional printing, also known as additive manufacturing, is a process of making a three-dimensional solid object from a digital model of virtually any shape. Many three-dimensional printing technologies use an additive process in which an additive manufacturing device forms successive layers of the part on top of previously deposited layers. Some of these technologies use inkjet printing, where one or more printheads eject successive layers of material. Three-dimensional printing is distinguishable from traditional object-forming techniques, which mostly rely on the removal of material from a work piece by a subtractive process, such as cutting or drilling.

Many existing three-dimensional printers form the printed objects using one or more build materials with little or no regard to the appearance of the surface of the object. However, some three-dimensional object printers also form two-dimensional printed images on a surface of the three-dimensional printed objects. The printer forms two-dimensional images on the object to improve the aesthetics of the three-dimensional printed object and to convey information such as printed instructions, part labels, barcodes, and the like. Many three-dimensional object printers apply a layer of a primer material to the outer surface of the three-dimensional printed object and form the two-dimensional printed image on the primer layer.

The build material that forms many three-dimensional printed objects can have an adverse impact on the quality of printed images. For example, a hue shift occurs when light passes through a portion of the printed image and scatters through a translucent build material in the object. FIG. 4 depicts an outer layer of build material 448, a primer material layer 450, and a layer of ink in a printed image 454 on the surface of the primer material layer 450. An incident light ray 404 strikes the ink layer 454. Some of the light penetrates through the ink layer 454 and reflects from the primer layer 450 as depicted by the ray 408. However, in the prior art printed object 454, a portion of the light ray 404 penetrates deeper in to the primer layer 450 and build material layer 448. The light ray scatters laterally as depicted by the ray 412. Some of the scattered light, such as the light ray 416, emerges from the surface of the primer layer 450 at a location outside of the printed ink layer 454. In the example of FIG. 4, the ink layer 454 is formed from a magenta ink. The scattered light 416 that emerges from the primer layer 450 also assumes a magenta hue that produces a "hue shift" in the apparent appearance of a region that is outside of the printed magenta ink layer 454.

FIG. 4 depicts the light scattering phenomenon, which is known to the art as the Yule-Nielsen effect. The Yule-Nielsen effect produces the hue shift in the color of the surface of the three-dimensional object. The hue shift changes the apparent color of regions of the three-dimensional printed object that are outside of the printed areas for different ink colors, and may change the appearance of the object in an undesirable manner. Consequently, improved systems and methods that form printed images on the surfaces of three-dimensional printed objects with reduced hue shift would be beneficial.

SUMMARY

In one embodiment, a method of forming a two-dimensional image on a surface of a three-dimensional printed object with reduced hue shift has been developed. The method includes operating with a controller a first plurality of ejectors to form a first layer of blocking material with an opacity level that prevents transmission of at least a substantial portion of light incident to the first layer on a surface of a three-dimensional printed object, operating with the controller a second plurality of ejectors to form a second layer of a primer material over the first layer of the blocking material, and operating with the controller a third plurality of ejectors to form a printed image with reference to predetermined image data using at least one marking agent on a surface of the second layer of primer material.

In another embodiment, a three-dimensional object printer that is configured to form a two-dimensional image on a surface of a three-dimensional printed object with reduced hue shift has been developed. The three-dimensional object printer includes at least one printhead, a support member, and a controller operatively connected to the at least one printhead. The at least one printhead includes a first plurality of ejectors configured to eject drops of a blocking material, a second plurality of ejectors configured to eject drops of a primer material, and a third plurality of ejectors configured to eject drops of at least one marking agent. The controller is configured to operate the first plurality of ejectors to form a first layer of the blocking material on a surface of a three-dimensional printed object positioned on the support member, the first layer having an opacity level that prevents transmission of at least a substantial portion of light incident to the first layer to another layer in the three-dimensional printed object, operate the second plurality of ejectors to form a second layer of the primer material over the first layer of the blocking material, and operate the third plurality of ejectors to form an image with the marking agent with reference to predetermined image data using the at least one marking agent on a surface of the second layer of primer material.

In another embodiment, an article formed by a three-dimensional object printer that includes a surface with a printed image that exhibits reduced hue shift has been developed. The article includes an object formed from at least one build material, a first layer of a blocking material formed on a surface of the object, the first layer having an opacity level that prevents transmission of at least a substantial portion of light incident to the first layer to another layer in the object, a second layer of a primer material formed over the first layer, and a third layer of at least one marking agent formed in a printed image on a surface of the second layer.

BRIEF DESCRIPTION OF THE DRAWINGS

The foregoing aspects and other features of an apparatus or printer that generates two-dimensional printed images on a surface of a three-dimensional printed object are explained in the following description, taken in connection with the accompanying drawings.

DETAILED DESCRIPTION

Figure 1:
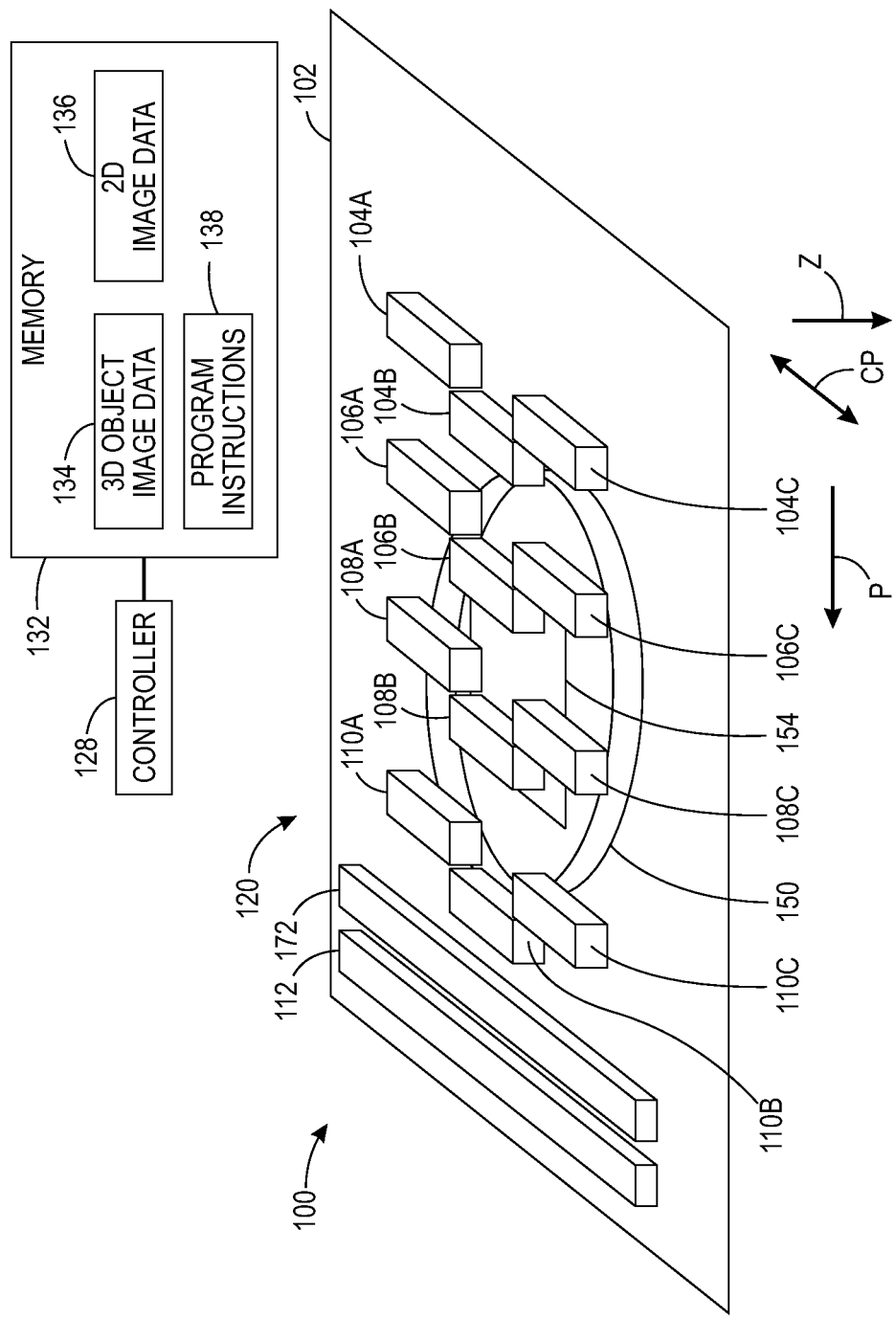
FIG. 1 is a diagram of a three-dimensional object printer.

For a general understanding of the environment for the device disclosed herein as well as the details for the device, reference is made to the drawings. In the drawings, like reference numerals designate like elements.

As used herein, the term "build material" refers to a material that is ejected in the form of liquid drops from a plurality of ejectors in one or more printheads to form layers of material in an object that is formed in a three-dimensional object printer. Examples of build materials include, but are not limited to, thermoplastics, UV curable polymers, and binders that can be liquefied for ejection as liquid drops from ejectors in a printhead and subsequently hardened into a solid material that forms an object through an additive three-dimensional object printing process. Some three-dimensional object printer embodiments employ multiple forms of build material to produce an object. In some embodiments, different build materials with varying physical or chemical characteristics form a single object. Some types of build material that form three-dimensional printed objects are optically transparent or translucent. Light penetrates and diffuses through the build material and at least a portion of the light that penetrates one surface of the three-dimensional printed object is visible through another surface of the three-dimensional printed object.

As used herein, the term "process direction" refers to a direction of movement of a support member past one or more printheads during a three-dimensional object formation process. The support member holds the three-dimensional object during the print process. In some embodiments, the support member is a planar member such as a metal plate, while in other embodiments the support member is a rotating cylindrical member or a member with another shape that supports the formation of an object during the three-dimensional object printing process. In some embodiments, the printheads remain stationary while the support member and object moves past the printhead. In other embodiments, the printheads move while the support member remains stationary. In still other embodiments, both the printheads and the support member move.

As used herein, the term "cross-process direction" refers to a direction that is perpendicular to the process direction and in the plane of the support member. The ejectors in two or more printheads are registered in the cross-process direction to enable an array of printheads to form printed patterns of build material over a two-dimensional planar region. During a three-dimensional object printing process, the printheads eject drops of the build material to form successive layers of build material that form a three-dimensional object.

As used herein, the term "primer" refers to a material that forms a durable coating over another surface to form an image receiving surface for ink or another marking agent. In some embodiments, the primer is a white material that forms a white background for a printed image, although other primer materials have a wide range of colors in addition to white. The primer forms a surface that promotes the adhesion of marking agents to form printed images on a surface of a three-dimensional printed object. The material composition and thickness of the primer layer enables some light to diffuse through the primer layer.

As used herein, the term "blocking material" refers to a material that exhibits a high level of opacity to incident visible light, which prevents transmission of all or a substantial portion of the incident visible light through a comparatively thin layer (e.g. 10 μm to 100 μm thick) of the blocking material. Opacity refers to the optical property of the layer of blocking material to prevent the transmission of the incident visible light through absorption, diffuse reflection, specular reflection, or a combination thereof, of the incident visible light. In some embodiments, the blocking material layer has an opacity level that prevents transmission of at least 50% of the incident visible light through the layer of blocking material. In some embodiments the blocking material absorbs more light than the material reflects over all or a wide range of the visible spectrum, while in other embodiments the blocking material is a highly reflective material. While not a requirement, many embodiments of the blocking material have neutral hues to minimize hue shifts that the blocking material produces when a layer of the blocking material lies underneath a printed image on a surface of a three-dimensional printed object. Black ink is one example of a blocking material that is used in many printers. As described below, black ink can darken the appearance of a printed image to a small degree, but has minimal impact on the perceived hues of the printed image. The black ink blocking material can include both matte black ink compositions that have low reflectivity levels and glossy black ink compositions that have comparatively high levels of reflectivity. Alternative blocking materials include metallic inks or other highly reflective materials.

As used herein, the term "marking agent" refers to any material that can be formed on a surface of an object to form visible marks including monochrome and color printed images that include text and graphics. Examples of marking agents include various forms of ink, including aqueous, solvent based, and phase-change inks. Other forms of marking agent include toner compounds. In some embodiments, the marking agent is formed over a layer of the primer to promote adhesion and visibility of the marking agent. As described in more detail below, in some embodiments a blocking material, such as black ink, forms a layer underneath a layer of primer material to reduce or eliminate light scatter. The reduction in light scatter also reduces or eliminates hue shift in in printed images that are formed on the surfaces of three-dimensional printed objects.

As used herein, the term "z-axis" refers to an axis that is perpendicular to the process direction, the cross-process direction, and to the plane of the support member in a three-dimensional object printer. At the beginning of the three-dimensional object printing process, a separation along the z-axis refers to a distance of separation between the support member and the printheads that form the layers of build material in a three-dimensional printed object. As the ejectors in the printheads form each layer of build material, the printer adjusts the z-axis separation between the printheads and the uppermost layer to maintain a substantially constant distance between the printheads and the uppermost layer of the object during the printing operation. In some embodiments, the support member moves away from the printheads during the printing operation to maintain the z-axis separation, while in other embodiments the printheads move away from the partially printed object and support member to maintain the z-axis separation.

FIG. 1 depicts a three-dimensional object printer 100 that is configured to operate printheads to form a three-dimensional printed object 150 and to form a printed image 154 on a surface of the object 150. The printer 100 includes a support member 102, printhead arrays 104A-104C, 106A-106C, 108A-108C, and 110A-110C, an ultraviolet (UV) curing device 112, controller 128, memory 132, and a leveler 172. In the illustrative embodiment of FIG. 1, the three-dimensional object printer 100 is depicted during formation of a three-dimensional printed object 150 that is formed from a plurality of layers of the build material. The printer 100 forms a two-dimensional printed image 154 on a surface of the object 150.

In the embodiment of FIG. 1, the support member 102 is a planar member, such as a metal plate, that moves in a process direction P. The leveler 172, printhead arrays 104A-104C, 106A-106C, 108A-108C, and 110A-110C; and UV curing device 112, form a print zone 120. The member 102 carries any previously formed layers of build material through the print zone 120 in the process direction P. During the printing operation, the support member 102 moves in a predetermined process direction path that passes the printheads multiple times to form successive layers of the build material in the object 150, primer layers on the surface of the object 150, and the printed image 154 on the surface of the primer layers on the object 150. In some embodiments, multiple members similar to the member 102 pass the print zone 120 in a carousel or similar configuration. One or more actuators move the member 102 through the print zone 120 in the process direction P. In the embodiment of FIG. 1, an actuator also moves the support member 102 in the direction Z away from the components in the print zone 120 after each layer of build material is applied to the support member 102. The actuator moves the support member 102 in the Z direction to maintain a uniform separation between the uppermost layer of the object 150 and the components in the print zone 120.

In the configuration of FIG. 1, the printhead array 104A-104C ejects drops of a build material toward the surface of the support member 102 to form layers of a three-dimensional printed object, such as the object 150. The printheads 104A-104C are arranged in a staggered configuration to enable a two-dimensional array of ejectors in each printhead to eject drops on a portion of the support member 102. The printheads 104A-104C are arranged in a "stitched" configuration to enable the ejectors in the printheads 104A-104C to form a continuous arrangement of the build material across the support member 102 in the cross-process direction CP. While FIG. 1 depicts an array of three printheads, alternative configurations include a greater or lesser number of printheads.

Each of the printheads 104A-104C includes a plurality of ejectors that receive the build material in a liquefied form and eject liquid drops of the build material. In one embodiment, each ejector includes a fluid pressure chamber that receives the liquid build material, an actuator such as a piezoelectric actuator, and an outlet nozzle. The piezoelectric actuator deforms in response to an electric firing signal and urges the liquefied build material through the nozzle as a drop that is ejected toward the member 102. If the member 102 bears previously formed layers of a three-dimensional object, then the ejected drops of the build material form an additional layer of the object. Each of the printheads 104A-104C includes a two-dimensional array of the ejectors, with an exemplary printhead embodiment including 880 ejectors. During operation, the controller 128 controls the generation of the electrical firing signals to operate selected ejectors at different times to form each layer of the build material for the object 150. In the printer 100, the controller 128 operates the ejectors in the printheads 104A-104C with reference to the 3D object image data 134 that are stored in the memory 132 to apply the build material.

In the printer 100, the printhead arrays 106A-106C, 108A-108C, and 110A-110C each include three printheads with the same or similar configurations to the printheads 104A-104C, but each of the printhead arrays ejects a different type of material. In the illustrative example of FIG. 1, the printheads 106A-106C eject drops of a blocking material. In one configuration, the blocking material is black ink that forms a layer underneath the image that reduces the effects of light scattering and hue shifting in printed images. Additionally, the ejectors in the printheads 106A-106C optionally eject black ink as part of the image formation process for the two-dimensional printed image. The printhead array 108A-108C eject drops of a primer material, such as a white primer coating material, that form a layer over the blocking material to receive drops of a marking agent in a printed image. The printhead array 110A-110C ejects drops of at least one color of marking agent to form printed images on an image receiving surface that is formed from a layer of the primer material on the three-dimensional printed object 150. While FIG. 1 depicts a single printhead array 110A-110C that ejects drops of the marking agent for simplicity, alternative embodiments include multiple printhead arrays that each eject a different ink color to form multi-color printed images.

While FIG. 1 depicts four printhead arrays that eject drops of the build material, blocking material, primer, and colored ink, alternative embodiments can include three or more printhead arrays that form printed objects with additional build materials. Another embodiment includes only a single printhead array. While the printhead arrays 104A-104C, 106A-106C, 108A-108C, and 110A-110C are each depicted as including three printheads, alternative configurations can include few printheads or a greater number of printheads to accommodate print zones with different sizes in the cross-process direction. Alternative embodiments can include additional printhead arrays, such as additional color ink printhead arrays or printhead arrays that emit different types of build material. While the printhead arrays 104A-104C, 106A-106C, 108A-108C, and 110A-110C remain stationary during operation in the printer 100, alternative printer embodiments include one or more printheads that move in the cross-process direction CP, process direction P, or in both the cross-process and process directions to form a three-dimensional printed object.

In the printer 100, the UV curing device 112 is an ultraviolet light source that produces UV light across the print zone 120 in the cross-process direction CP. The UV light from the UV curing device 112 hardens the build material that is formed on the uppermost layer of the object 150 to form a durable portion of the object 150. The UV curing process solidifies the build material to accept additional layers of build material or coatings that form an image receiving surface for a two-dimensional printed image on an exterior of the three-dimensional printed object 150.

As use herein, the term "leveler" refers to a member that is configured to engage the uppermost surface of each layer of the build material before the UV curing device 112 cures the build material. In the printer 100, the leveler 172, which is also referred to as a planarizer, applies a heated surface to the object 150. The heated surface of the leveler 172 softens or melts a portion of the uppermost layer of the build material in the object 150. The leveler 172 also applies pressure to smooth the uppermost layer of build material in the object 150 and form a uniform surface that receives an additional layer of the build material during a subsequent pass through the print zone 120. In some embodiments, the leveler 172 is a roller that is coated with a low surface energy material to prevent adhesion of the build material to the surface of the leveler 172. While the other components in the print zone 120 remain at a predetermined distance in the Z direction from the object 150, the leveler 172 engages the object 150 to smooth the uppermost layer. In the configuration of FIG. 1, the leveler 172 engages the uppermost layer of build material, primer material, or an optically transparent protective material formed in the object 150, but does not engage layers of ink that coat the object 150 to enable the printer 150 to form the printed image 154 on the outer surface of the object 150.

The controller 128 is a digital logic device such as a microprocessor, microcontroller, field programmable gate array (FPGA), application specific integrated circuit (ASIC) or any other digital logic that is configured to operate the printer 100. In the printer 100, the controller 128 is operatively connected to one or more actuators that control the movement of the support member 102, the printhead arrays including the printhead arrays 104A-104C, 106A-106C, 108A-108C, and 110A-110C, and the UV curing device 112. The controller 128 is also operatively connected to a memory 132. In the embodiment of the printer 100, the memory 132 includes volatile data storage devices such as random access memory (RAM) devices and non-volatile data storage devices such as solid-state data storage devices, magnetic disks, optical disks, or any other suitable data storage devices. The memory 132 stores three-dimensional (3D) object image data 134, two-dimensional (2D) printed image data 136, and stored program instructions 138. The controller 128 executes the stored program instructions 138 to operate the components in the printer 100 to both form the three-dimensional printed object 150 and print two-dimensional images on one or more surfaces of the object 150. The 3D object image data 134 includes, for example, a plurality of two-dimensional image data patterns that correspond to each layer of build material that the printer 100 forms during the three-dimensional object printing process. The controller 128 ejects drops of the build material from the printheads 104A-104C with reference to each set of two-dimensional image data to form each layer of the object 150. The memory 132 also stores two-dimensional image data 136 that correspond to a printed image that the printer 100 forms on the surface of the three-dimensional printed object 150 using one or more colors of marking agent from the printheads 110A-110C.

During operation, the controller 128 operates the ejectors in the printheads 104A-104C to form the three-dimensional printed object 150 from the build material with reference to the three-dimensional image data 134. After printing at least a portion of the three-dimensional printed object 150, the controller 128 operates the black ink printheads 106A-106C to eject a layer of the light blocking black ink onto the surface of the three-dimensional printed object 150. The controller 128 then operates the printheads 108A-108C to eject drops of the primer material over the layer of blocking material to form a primer layer with an image receiving surface for a printed ink image. The controller 128 then operates the color ink printheads 110A-110C and optionally the black ink printheads 106A-106C to form a two-dimensional printed image on the surface of the primer with reference to the two-dimensional image data 136. As described in more detail below, the black ink forms the layer of blocking material that prevents the scattering of light that is transmitted through portions of the printed image, which reduces or eliminates visible hue shift in the printed image.

Figure 2:
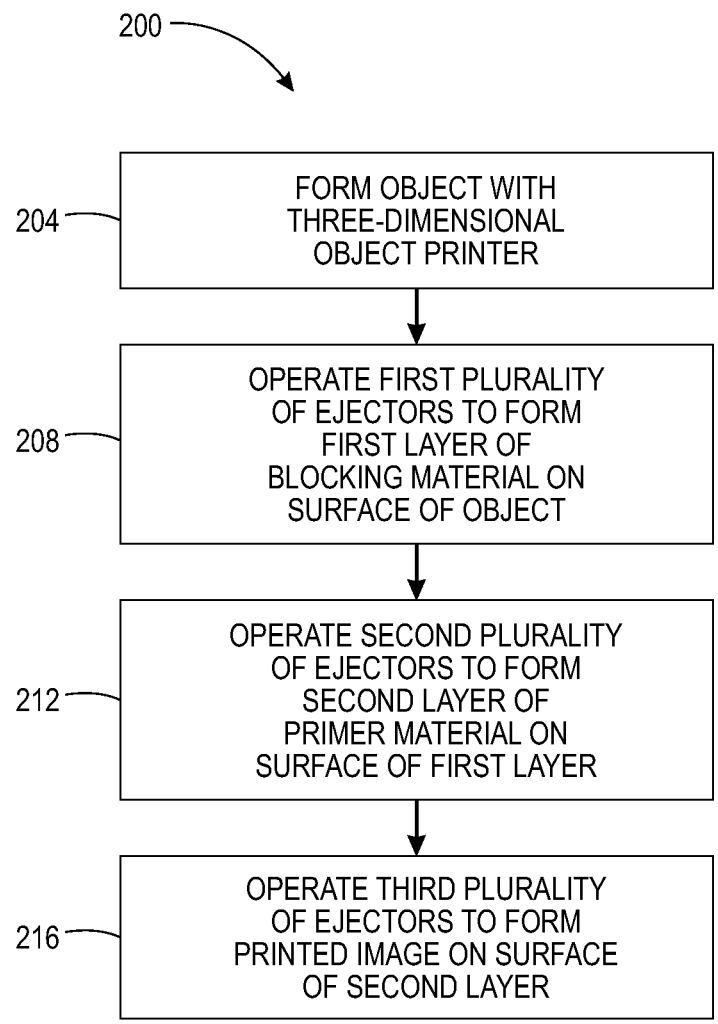
FIG. 2 is a block diagram of a process for operation of a three-dimensional object printer to form two-dimensional images on a surface of a three-dimensional printed object with reduced hue shift.

FIG. 2 depicts a process 200 for forming a three-dimensional printed object with a two-dimensional image printed on a surface of the object. In the discussion below, a reference to the process 200 performing an action or function refers to the operation of a controller to execute program instructions to perform the task or function in conjunction with other components in a three-dimensional object printer. The process 200 is described in conjunction with the printer 100 of FIG. 1 and the view of the printed object 150 in FIG. 3 for illustrative purposes.

Figure 3:
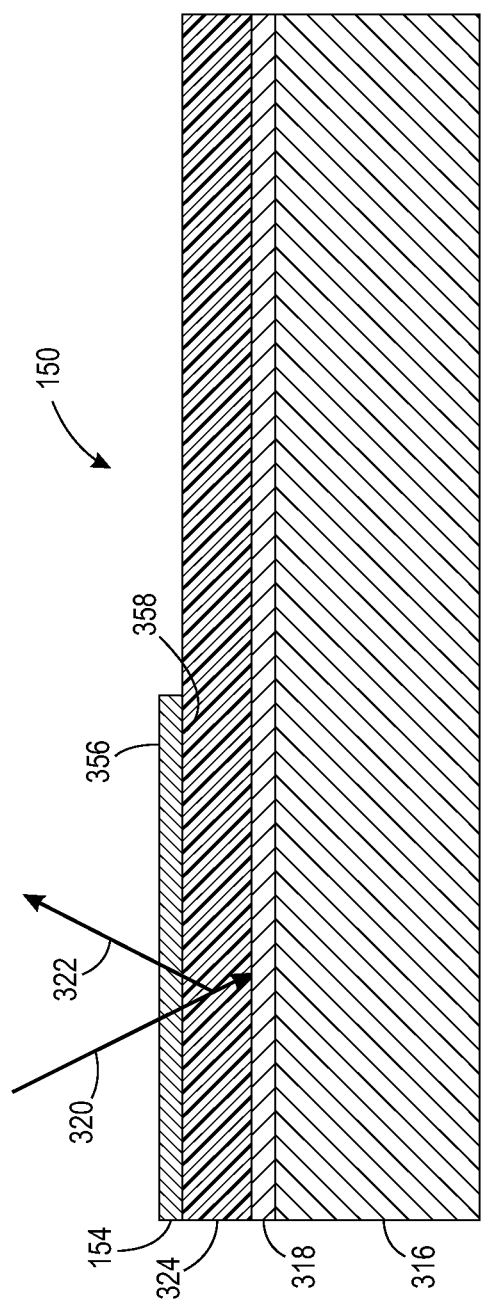
FIG. 3 is a cross-sectional view of a portion of a printed image formed on a surface of a three-dimensional printed object that is formed over a primer layer and another layer of a blocking material to reduce or eliminate hue shift.

During process 200, the printer 100 forms a three-dimensional printed object having a surface that receives additional layers to support a two-dimensional printed image (block 204). As described above, the controller 128 operates the ejectors in the printheads 104A-104C to eject drops of the build material. The controller 128 applies successive layers of the build material to form the three-dimensional printed object 150 with reference to the 3D object image data 134. FIG. 3 depicts the object 150 with the build material layer 316 that forms a surface to receive additional layers of material.

Process 200 continues as the controller 128 operates the ejectors in the printheads 106A-106C to form a layer of the blocking material on the surface of the build material in the three-dimensional printed object 150 (block 208). The printer 100 forms the blocking material layer having an appropriate composition and thickness to produce an opacity level that prevents transmission of at least a substantial portion of incident visible light to another underlying layer in the three-dimensional printed object 150. In some embodiments, the build material is an optically transparent or translucent material that transmits and diffuses light that is not blocked by the blocking material layer. In one embodiment, the controller 128 operates the printheads 106A-106C to eject a uniform layer of black ink blocking material that covers the entire region of the surface of the object 150 that receives the printed image 154. In one embodiment, the printer 100 forms the light blocking material layer with a thickness of between approximately 10 μm and 100 μm. The thickness of the blocking material depends upon the transmittance properties of the blocking material to enable the blocking layer to prevent at least 50% of incident visible light from passing through the blocking material in the blocking layer.

As depicted in FIG. 3, the black ink layer 324 is a blocking layer with a high level opacity that prevents transmission of all or a substantial proportion of the incident visible light that penetrates through the printed image layer 154 and overlying primer material layer 324. Additionally, if some light penetrates through the black ink layer 318 and scatters through the build material 316, the same black ink layer 318 prevents transmission of all or a substantial portion of the scattered light as the scattered light travels towards the surface of the object 150. Thus, the blocking material in the layer 318 reduces or eliminates the occurrence of scattered light that would otherwise produce a visible hue shift on the surface of the printed object 150.

Referring again to FIG. 2, the process continues as the controller 128 operates the ejectors in the printheads 108A-108C to form a layer of the primer material over the layer of the blocking material (block 212). As described above, in some embodiments the primer material is a white material that forms a background and image receiving surface for one or more colors of marking agent that form the two-dimensional printed image. In FIG. 3, the primer layer 324 is formed over the layer of the blocking material 318. The printer 100 forms the primer layer 324 with a thickness of between approximately 50 µm and 200 µm. The thickness of the primer layer is similar to a thickness of paper sheets that commonly receive printed images and the primer layer is thick enough to form a visually uniform surface to receive the drops of marking agent that form the printed image 154.

Figure 4:
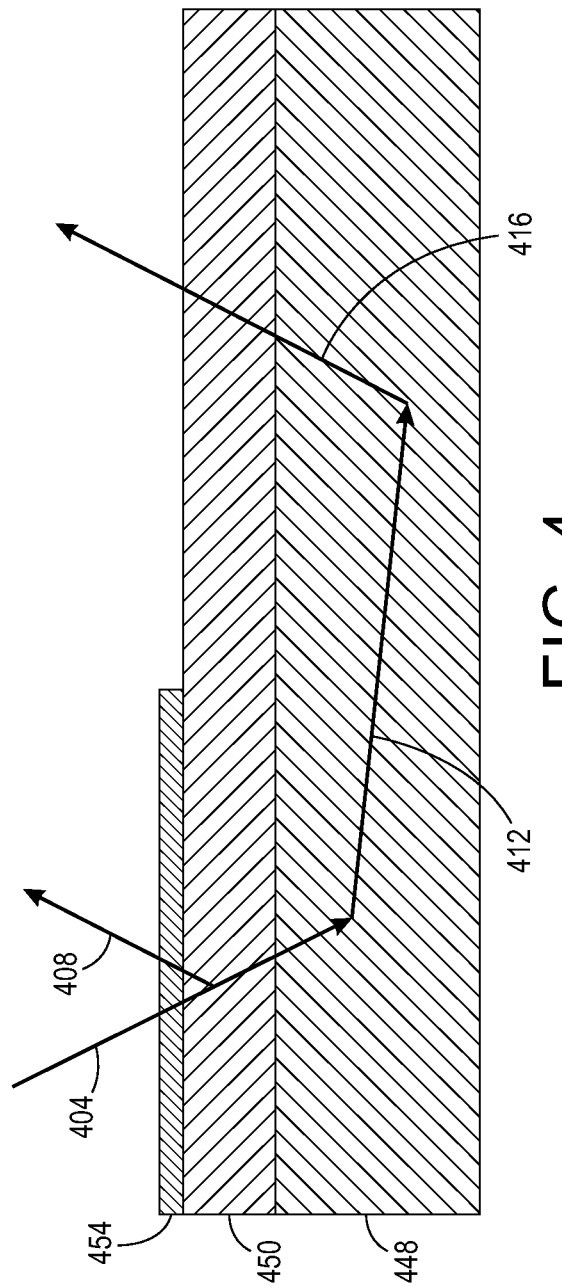
FIG. 4 is a diagram of a prior art printed image formed on a surface of a three-dimensional printed object that experiences hue shift.

As depicted in FIG. 3, the primer layer 324 enables a portion of the light that penetrates through the first side of the printed image to reflect back through the second side of the printed image. For example, a portion of the light ray 320 passes through the first side 356 of the ink in the printed image 154 and a reflected ray 322 in the primer layer 324 passes through the second side 358 of the ink in the printed image 154. The reflected light increases the apparent brightness of the ink in the printed image 154, which typically improves the perceived image quality of the printed image 154. However, the primer layer 324 is not thick enough to enable light ray 320 to scatter laterally to the same degree that is depicted in the prior art FIG. 4. Instead, the black ink layer 318 blocks most or all of the light rays that would penetrate into the build material layer 316 and scatter laterally to produce a noticeable hue shift in the printed image 154.

Referring again to FIG. 2, the process 200 continues as the printer 100 ejects drops of one or more marking agents to form the printed image on the surface of the primer material layer (block 216). In the printer 100, the controller 128 operates the ejectors in the printheads 110A-110C to eject drops of ink in a predetermined pattern to form the printed image on the surface of the primer layer. In some embodiments, the printed image also includes black ink and the controller 128 operates the ejectors in the printhead array 106A-106C to form portions of the image that include black ink. As described above, the controller 128 operates the ejectors in the printhead arrays 110A-110C and 106A-106C to form images including text and graphics with reference to the two-dimensional image data 136.

As depicted in FIG. 1 and FIG. 3, the three-dimensional object printer 100 forms the object 150 with a printed image that has little or no hue shift. The object 150 includes the three-dimensional printed object formed from one or more layers of the build material 316, the layer of the blocking material 318, the layer of the primer material 324, and the layer of the printed marking agents that form the printed image 154. As described above, the thickness of the blocking material layer 318 is between approximately 10 µm and 100 µm and the thickness of the primer material layer 318 is between approximately 50 µm and 200 µm. As described above, the blocking material layer 318 reduces or eliminates the occurrence of lateral light ray scattering through the primer layer 324 and build material layers 316. Thus, the incident light rays that reach the surface of the object 150 reflect from the first side 356 of the printed image 154 or from a portion of the primer material 324 that returns the light through the second side 358 of the printed layer 154 with little or no hue shifting. In some embodiments, the blocking material layer 318 produces a small reduction to the perceptible brightness of the printed image 154, but the reduction in brightness is much less noticeable to the average human observer in comparison to the hue shifting in the prior printed objects.

While FIG. 3 depicts a single surface of a three-dimensional object, the printer 100 is further configured to produce objects where the layer of blocking material is applied to multiple sides of the object to block light from passing through the transparent or translucent build material to produce hue shifting or other visible artifacts. For example, in another embodiment the printer 100 deposits a layer of the blocking material near all of the outer surfaces of the object 150. The blocking material reduces or eliminates transmission of light from one surface of the object 150 to any other surface in the object 150, including both flat and curved surfaces. In some instances, the printer 100 forms printed images on multiple surfaces of the object, and the layers of blocking material reduce the effects of hue shift due to light diffusion through the object 150 from multiple angles and through multiple surfaces on the object.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A three-dimensional object printer comprising:
   at least one printhead comprising:
     a first plurality of ejectors configured to eject drops of a blocking material;
     a second plurality of ejectors configured to eject drops of a primer material; and
     a third plurality of ejectors configured to eject drops of at least one marking agent;
   a support member; and
   a controller operatively connected to the at least one printhead, the controller being configured to:
     operate the first plurality of ejectors to form a first layer of the blocking material on a surface of a three-dimensional printed object positioned on the support member, the first layer having an opacity level that prevents transmission of at least a substantial portion of light incident to the first layer to another layer in the three-dimensional printed object;
     operate the second plurality of ejectors to form a second layer of the primer material over the first layer of the blocking material; and
     operate the third plurality of ejectors to form an image with the marking agent with reference to predetermined image data using the at least one marking agent on a surface of the second layer of primer material.

2. The three-dimensional object printer of claim 1, the controller being further configured to:
   operate of the first plurality of ejectors to form the first layer with black ink.

3. The three-dimensional object printer of claim 2, the controller being further configured to:
   operate the first plurality of ejectors to form a portion of the printed image with the black ink.

4. The three-dimensional object printer of claim 1, the controller being further configured to:
   operate the first plurality of ejectors to form the first layer of the blocking material with a thickness of between approximately 10 µm and 100 µm.

5. The three-dimensional object printer of claim 1, the controller being further configured to:

operate the second plurality of ejectors to form the second layer with a white primer material that enables a portion of light passing through the printed image from a first side of the printed image to be reflected through the marking agent from a second side of the printed image.

6. The three-dimensional object printer of claim 1, the controller being further configured to:
operate the second plurality of inkjets to form the second layer with a thickness of between approximately 50 μm and 200 μm.

7. The three-dimensional object printer of claim 1, the controller being further configured to:
operate the third plurality of ejectors to form the printed image from a plurality of ink drops.

* * * * *